United States Patent [19]
Gilleran et al.

[11] 3,886,550
[45] May 27, 1975

[54] DUAL OSCILLATOR

[75] Inventors: Frank M. Gilleran, Smithtown; Arlindo Jorge, Glen Cove, both of N.Y.

[73] Assignee: The United States of America as represented by the Secretary of the Navy, Washington, D.C.

[22] Filed: Aug. 26, 1969

[21] Appl. No.: 854,808

[52] U.S. Cl. ............................ 343/17.2 R; 343/17.5
[51] Int. Cl. ............................................... G01s 7/28
[58] Field of Search ............ 343/17.2, 17.2 PC, 17.5

[56] References Cited
UNITED STATES PATENTS

| | | | |
|---|---|---|---|
| 2,433,283 | 12/1947 | Luck | 343/17.5 X |
| 3,024,459 | 3/1962 | Glegg | 343/17.5 |
| 3,110,897 | 11/1963 | Laurent | 343/17.5 X |
| 3,154,782 | 10/1964 | Kagawa et al. | 343/17.2 PC |
| 3,222,674 | 12/1965 | Villepelet | 343/17.2 X |
| 3,372,390 | 3/1968 | Maugue | 343/17.5 X |

*Primary Examiner*—Malcolm F. Hubler
*Attorney, Agent, or Firm*—Richard S. Sciascia; Ervin F. Johnston; John Stan

[57] ABSTRACT

A radar system, including a transmitter and receiver, comprising two crystal-controlled oscillators oscillating at different frequencies, to accomplish the local oscillator function, the difference between the two frequencies being equal to the intermediate frequency (IF) of the receiver of the radar system when measured at the radio frequency (RF) of the radar transmission.

6 Claims, 6 Drawing Figures

NOTE
$\Delta t$ IS THE "TRANSMITTER ON" TIME.

Patented May 27, 1975    3,886,550

NOTE
$\Delta t$ IS THE "TRANSMITTER ON" TIME.

INVENTORS.
FRANK M. GILLERAN
ARLINDO JORGE
BY
ERVIN F. JOHNSTON
ATTORNEY.
JOHN STAN, AGENT.

DUAL OSCILLATOR

The invention described herein may be manufactured and used by or for the Government of the United States of America for governmental purposes without the payment of any royalties thereon or therefor.

In prior art radar systems, it is necessary to generate two RF signal frequencies, the transmitted carrier frequency $f_0$ and a receiver local oscillator frequency which is equal to $f_0$ plus the IF frequency, $f_{IF}$, or $f_0 + f_{IF}$. The frequency $f_0$ to be transmitted is generated while simultaneously feeding the frequency at $f_0$ and the IF signal $f_{IF}$ to a mixer to generate the frequency $f_0 \pm f_{IF}$ and then filtering that signal to yield only $f_0 + f_{IF}$. This method has the disadvantage that the power capability of the mixer is limited.

The single oscillator, not necessarily crystal-controlled, used in the prior art was of the limited-life microwave oscillator type such as a reflex klystron, a backward-wave oscillator, or voltage tunable magnetron. Stability was obtained with these oscillators by using automatic frequency control (AFC) and/or automatic phase control (APC) loops and stabilizing cavities. An oscillator system of this type required a high daily maintenance rate to attain operation within stability specifications.

In contrast, in the radar systems of this invention, the crystal-controlled oscillators are highly reliable long-life solid-state devices using a stable crystal to determine a base frequency to the desired RF frequency for transmission.

The "dual oscillator" technique of this invention utilizes two crystal-controlled oscillators, one in the transmitter and the other in the receiver. The oscillators are "matched" in the base frequency stage. The oscillators are separated in frequency by the IF difference required for receiver processing at the desired RF transmission. The matched oscillators are locked during an initial alignment to maintain coherency, as is described in more detail hereinbelow. The dual oscillator technique is more reliable than that previously used in the prior art, because, in addition to replacing the local oscillator and its frequency control system, it also replaces the mixer stage which generated the IF offset between the local oscillator and transmitted frequency and an intermediate stage of RF amplification.

One drawback to a system using two crystal-controlled oscillators is that both oscillators are on at all times, creating the danger of leakage and radiation of the transmitter frequency into the receiver channel between pulses. This, however, can be controlled by shielding. For pulse compression, at transmitting frequencies generally used, the transmitted frequency must be swept approximately four MegaHertz during the pulse.

The general purpose of this invention is to provide a radar system which embraces all the advantages of similarly employed radar systems and possesses none of the aforedescribed disadvantages. To attain this object, the present invention contemplates a unique combination of two crystal-controlled oscillators, the frequency of oscillation of each being such that the difference frequency is, generally, the IF frequency $f_{IF}$ at which the radar receiver operates.

Accordingly, one object of the present invention is the provision of a radar system wherein the power capability of the mixer stage is not a limiting factor with respect to the amount of power which can be transmitted.

Another object is to provide a radar system which avoids a very significant power loss in the mixing and filtering stages.

A further object of the invention is the provision of a radar system with much-improved frequency stability.

Still another object is to provide a radar system having a reduction in the number of tunable devices required.

Other objects and many of the attendant advantages of this invention will be readily appreciated as the same becomes better understood by reference of the following detailed description, when considered in connection with the accompanying drawings, in which like reference numerals designate like parts throughout the figures thereof and wherein.

Before discussing the figures in more detail, the differences between prior art systems and that of the present invention will be elaborated upon.

This invention realtes to a dual-oscillator arrangement for generating, commonly 30 Megahertz (MHz), offset or intermediate frequency signal required in radar system applications. In such systems, it is necessary to generate one carrier frequency signal and one signal oscillating at a frequency higher than the carrier. Conventionally, in the prior art, this is done by mixing the signal having a frequency of 30 MHz with the carrier and then using a filter to separate the upper sideband frequency. In the present invention, two crystal-controlled oscillators are used, one operating at the carrier frequency $f_0$ and, one at the frequency of the upper sideband $f_0 + f_{IF}$, where $f_{IF}$ in a specific embodiment was 30 MHz.

This difference in frequency between the transmitted pulse and the receiver local oscillator corresponds to the intermediate frequency $f_{IF}$ setting of the radar receiver. Echoes from targets, which are at the transmitter frequency $f_0$, are mixed with the local oscillator signal $f_0 + f_{IF}$ in the mixer to generate the intermediate frequency $f_{IF}$. This IF bears the range information carried by the echo to the receiver amplifier. The tolerance placed on the intermediate frequency is, for example, 5 KHz, which corresponds to a range accuracy substantially better than a fifteen-yard standard. This IF applies directly to the difference between the pulse frequency and the local oscillator frequency during the interpulse period immediately following, and is independent of the accuracy requirements of either the transmitter or receiver local oscillator frequencies.

There are two methods available for generating this difference frequency or IF; these are the mixing technique, similar to that presently used in the prior art, and a new one in which two separate oscillators are used.

Figure 1:
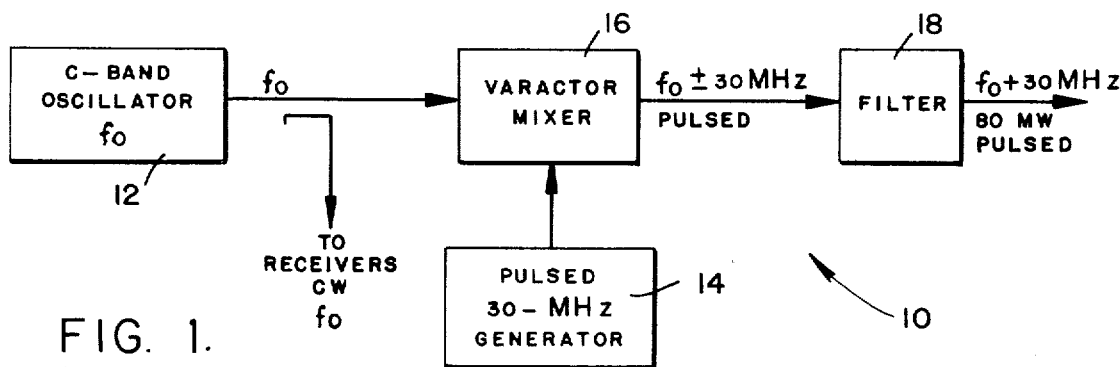
FIG. 1 is a block diagram of a prior art radar system, showing the generation of the receiver intermediate frequency through mixing.

The description of the former, prior art, method is as follows. Reference is directed to FIG. 1 for a description of this prior art radar system 10. The C-band (frequencies between 3.9 and 6.2 KMHz) microwave signal $f_0$ generated by the C-band oscillator 12 is mixed with a separate 30 MHz source, pulsed 30-MHz generator 14, in a mixer 16 to produce two side bands, ±30 MHz away from the C-band signal. Then, the desired sideband is selected by filtering in filter 18. This prior art system can use the transmitter klystron amplifier as an active mixer and filter. This can also be done by a varactor mixer, as is shown in FIG. 1, and a tunable, narrow-band passive filter, which provides the required minimum 40 db of attenuation of the local oscillator and unwanted sideband frequencies. This design involves a 12 db conversion loss in the varactor mixer 16 and a 3 db loss in the filter 18.

Discussing, briefly, output power limitations of prior art devices, preliminary survey has established a level of 160 milliwatts per sideband as about the maximum power capability of solid state mixers. Thus, no matter how much power is available at the mixer input, only 40 milliwatts will be delivered to the driver stage, assuming an additional 3 db loss in cables and connectors. Because of this limitation, this method is not useful for the two highest power driver choices. Moreover, only the two-cavity klystron and the voltage-tunable magnetron stalo can produce sufficient power to realize the 80-milliwatt maximum. The klystron-stalo will have an output of 15 milliwatts. One can get a possible 20-milliwatt output for a solid state device in an integrated oscillator-mixer package.

If mixing is used to generate the 30-MHz intermediate frequency with a voltage-controlled 30 MHz generator, the modulation is easily accomplished by appropriately sweeping the 30-MHz oscillator voltage. The frequency modulation on this intermediate frequency pulse is retained and imposed on the transmitted pulse through mixing. To a good approximation, a linear voltage sweep will produce linear frequency modulation. The stalo-chirp system referred to earlier is of this kind; it is prior art. The frequency modulation may also be impressed on the microwave oscillator itself if its frequency is sensitive to voltage. If this is done, a crystal-controlled 30-MHz oscillator may be employed with improved stability.

In the new method of this invention, mixing and filtering, and the consequent 16 db loss in the method of the prior art, are avoided. Two separate oscillators, one for the transmitter and one for the receiver, are employed; frequencies are set conventionally, 30 MHz apart. Because of the cost, size, and obvious disadvantages in reliability in using two microwave tube oscillators, only crystal-controlled devices are considered here. More than enough power is available for any driver choice, since the oscillator output is fed directly, without further loss except for cables and connectors, to the driver.

The new two-oscillator method employs neither mixing nor voltage-frequency controllable devices, so that neither of these techniques can be used. A frequency-modulation technique, however, may be used with crystal-controlled oscillators which depends on the generation of a small frequency excursion at low frequencies. Multiplication is then used both to raise the frequency to operating levels and to extend the frequency modulation sweep. A phasemodulation method may be employed for this purpose.

To achieve the necessary frequency swing, the output of the basic crystal source (before multiplication) is fed to a phase modulator, using grid phase modulation. This device contains an electronically variable element which varies the phase in response to an applied signal. If the phase is varied at a changing rate, the carrier is frequency-modulated. For example, a band-pass or low-pass filter with a voltage-variable capacitor (varactor) may be employed. If the shape of the voltage-time curve applied to the device is such that the phase is proportional to the square of the time, then the frequency will vary linearly with time and linear frequency modulation will result.

FIG. 3 shows the two methods of frequency modulation in three separate configurations.

Figure 2:
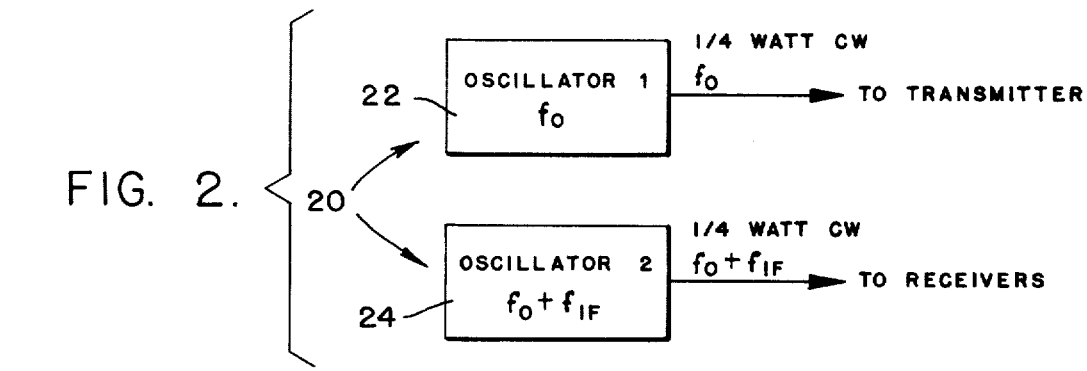
FIG. 2 is a very simplified block diagram of the present invention, showing the generation of the intermediate frequency difference by using two separate oscillators.

Referring now to FIG. 2, wherein is shown the basic concept of this invention, therein is shown part of a radar system 20, including a transmitter and receiver, comprising two crystal-controlled oscillators 22 and 24, one in the transmitter and the other in the receiver, respectively, oscillating at different frequencies, the difference between the two frequencies being related to the intermediate frequency of the receiver of the radar system. In this instance, the difference between the two chosen frequencies is the IF frequency $f_{IF}$.

Figure 3A:
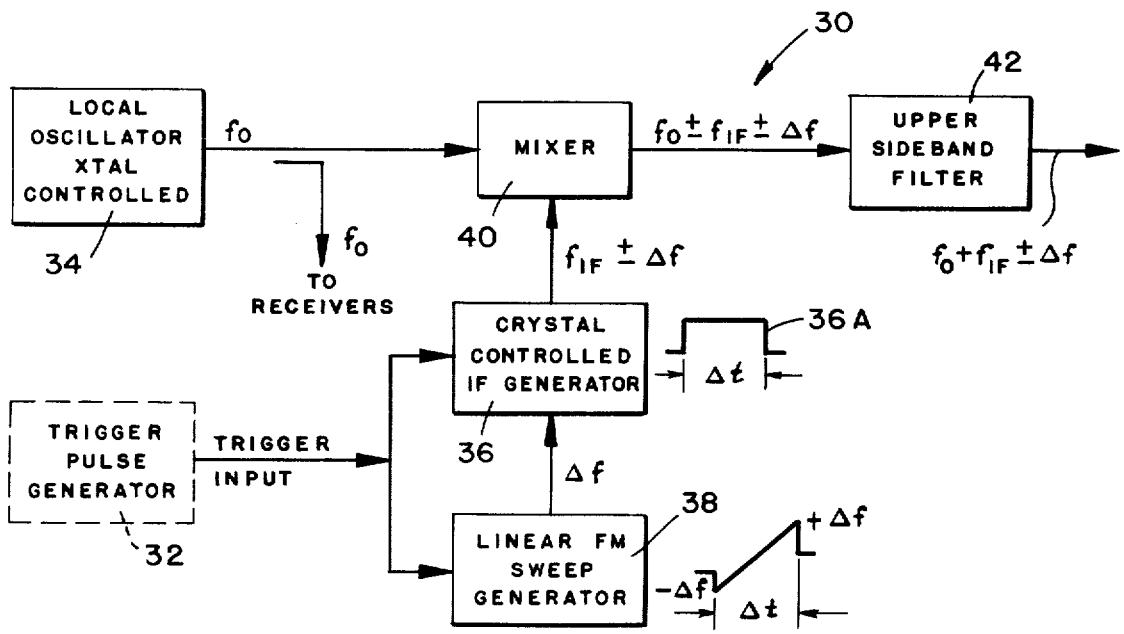
FIG. 3 shows three block diagrams showing different embodiments of the present invention.

Referring now to FIG. 3A, therein is shown the first of three embodiments of a radar system 30, wherein modulating pulses are triggered by a trigger pulse generator 32, shown dotted. Generator 32 is sometimes termed a synchronizer trigger pulse generator, and, perhaps more often, a radar-synchronizer trigger generator.

The radio-frequency (RF) stage of the radar receiver, now shown, operates at a frequency $f_0$, as is true of the other two embodiments of this invention. A local crystal-controlled oscillator 34 produces a carrier frequency $f_0$.

A crystal-controlled IF generator 36 generates a train of frequencies having a frequency $f_{IF}$, the train being triggered by and limited in length by pulses having a time duration $\Delta t$ generated by the trigger pulse generator 32.

A function generator in the form of a linear FM sweep generator 28, also triggered by pulses having the same time duration $\Delta t$ from the trigger pulse generator 32, modulates the train of pulses generated by the crystal-controlled IF generator 36 as a function $\pm \Delta f$ of frequency $f_0$, the frequency sweeping by generator 38 causing the pulse train to be frequency modulated.

The radar system 30 also includes a mixer 40 whose inputs are the continuous-wave output from the local oscillator 34 and the crystal-controlled IF generator 36, to produce a frequency-modulated signal whose output frequency is $f_0 \pm f_{IF} \pm \Delta f$.

This signal having a frequency $f_0 \pm f_{IF} \pm \Delta f$ from the output of mixer 40 is equivalent to the combination of two signals, one having a frequency $f_0 + f_{IF}$ and the other having a frequency $f_0 - f_{IF}$, each of which is frequency modulated from $-\Delta f$ to $+\Delta f$.

Finally, an upper sideband filter 42 is connected to the output of the mixer 40, for removing all sidebands except one whose frequency is $f_0 + f_{IF} \pm \Delta f$. Specifically, $f_0 + f_{IF} \pm \Delta f$ means a pulsed signal whose carrier frequency is $f_0 + f_{IF}$, and which is frequency-modulated from $-\Delta f$ to $+\Delta f$ about that carrier.

Figure 3B:
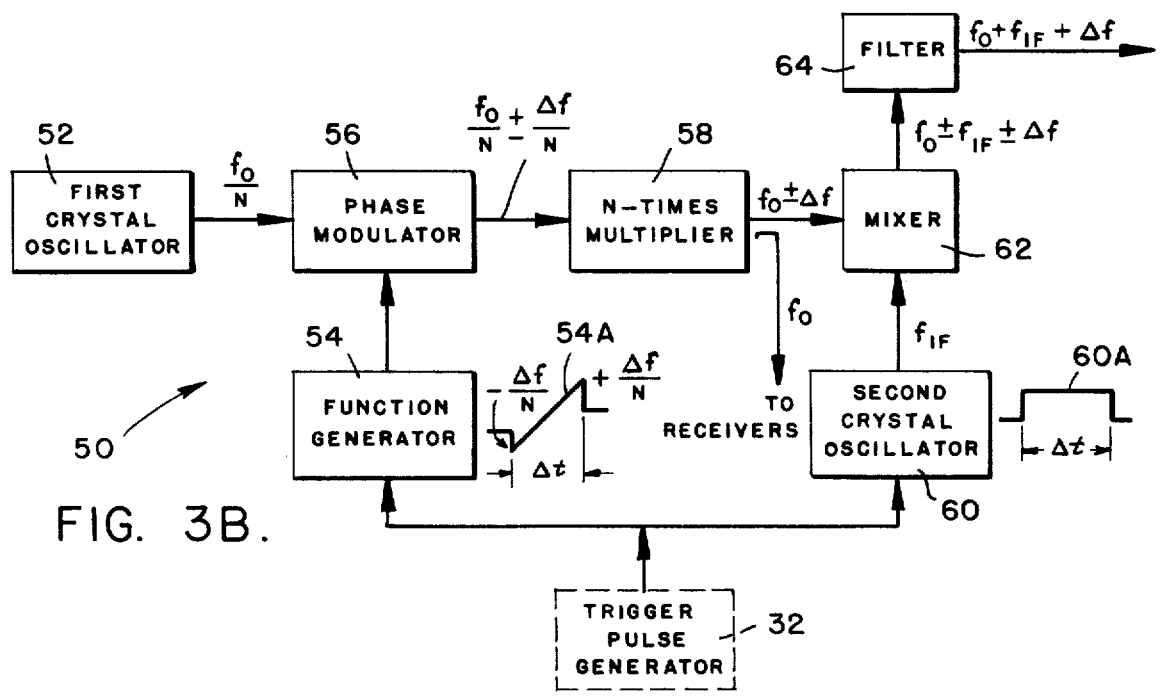

Referring now to FIG. 3B, therein is shown a second embodiment of a radar system 50, including a first crystal-controlled oscillator 52 for generating a carrier frequency oscillating at a frequency of $f_o/N$, where N is an integer. A function generator 54, generally a linear FM sweep generator, triggered by pulses from the trigger pulse generator 32, modulates the carrier frequency as a function $\pm\Delta f$, and therefore as a function $\pm\Delta f/N$, of frequency $f_o$. A phase modulator 56, having as inputs the carrier output of the first crystal-controlled oscillator 52 and the modulating output of the function generator 54, modulates the carrier frequency, $f_o$, resulting in an output frequency $(f_o/N) \pm (\Delta f/N)$. An N-times multiplier 58 multiplies the output of the phase modulator 56, to produce an output frequency $f_o \pm \Delta f$. A second crystal-controlled oscillator 60 generates a train of frequencies having a frequency $f_{IF}$, the IF frequency of the receiver of the radar system, the pulse train being triggered by and limited in length, and therefore time duration $\Delta t$, by pulses from the trigger pulse generator 32. A mixer 62 mixes the outputs of the N-times multiplier 58 and the second crystal-controlled oscillator 60 to produce an output signal having a frequency $f_o + f_{IF} \pm \Delta f$. Finally, a filter 64 connected to the output of the mixer 62 removes all sidebands except one whose frequency is $f_o + f_{IF} \pm \Delta f$.

In FIG. 3B the pulse train 60A is not frequency-modulated. It is, however, a constant frequency $f_{IF}$, 30 MHz in an embodiment built. Frequency modulation is accomplished by the application of signal 54A to the phase modulator 56 to frequency modulate the $f_o/N$ output signal from the first crystal oscillator 52. This frequency modulation only lasts for the time period or duration $\Delta t$ equal to the duration of signal 54A and signal 60A from second crystal oscillator 60. These two signals 54A and 60A are time coincident, and where they are mixed in mixer 62, the output signals from that mixer 62 are signals which are frequency-modulated at a radio frequency, i.e., the output signal of mixer 62 is composed of two signals $f_o + F_{IF}$ and $f_o - f_{IF}$, each of which is frequency-modulated from $-\Delta f$ to $+\Delta f$.

It should be pointed out that, in FIGS. 3A and 3B, the waveforms 36A and 60A associated with the $f_{IF}$ (30 MHz IF) generator 36 or 60, respectively, is a pulse enveloping a 30 MHz signal. The picture as shown for clarity of illustration is the detected envelope of that 30 MHz waveform. The undetected waveform would look like a comparatively short train, or pulse, of frequencies at 30 MHz. The rectangular pulse itself, of course, does not have a repetition rate of 30 MHz, which is the IF frequency. The repetition rate of the pulse train itself is determined by the repetition rate of the trigger input generated by the trigger pulse generator 32.

Figure 3C:
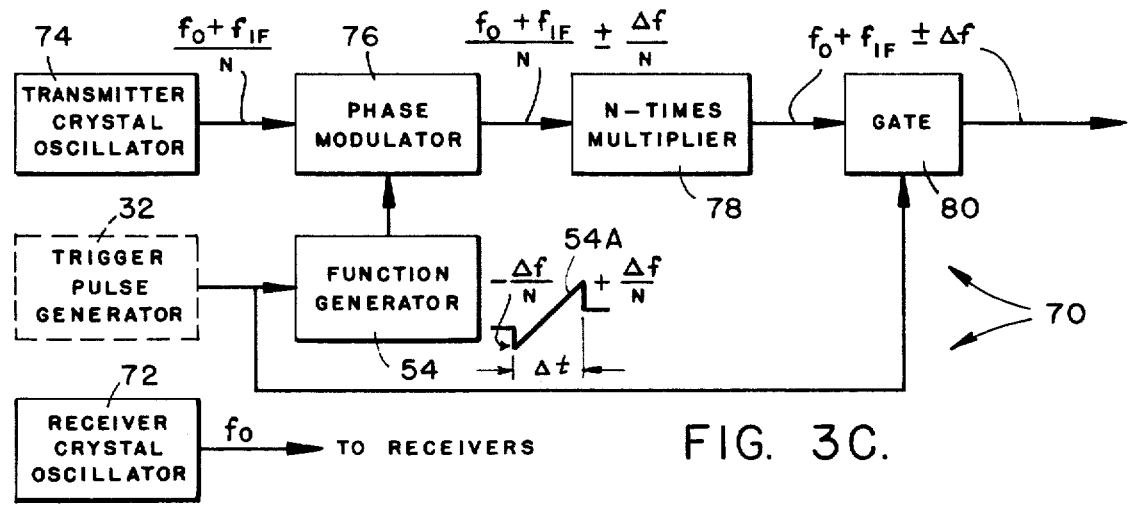

It should also be pointed out that FIG. 3B, like FIGS. 3A and 3C, shows a frequency difference of $f_o \pm \Delta f$ (= 30 MC$\pm \Delta f$) for the difference between the transmitter frequency and the receiver frequency. In FIG. 3B, the function generator 54 sweeps or modulates only during transmitter on time to develop a signal $\pm\Delta f/N$. The time period for this sweep is the same as that for the detected 30-MHz crystal oscillator pulse. Another way of stating this is that the time durations of pulses 54A and 60A are the same, as are the beginning of these pulses. Since the swept frequency signal 54A is then only on for the "transmitter on time," at all other times, that is, during the "receiver on time," the signal out of the N-times multiplier 58 is $f_o$ because the signal into it is $f_o/N$, since the swept frequency signal is not on during the "receiver on time."

Referring now to FIG. 3C, therein is shown the third of the three embodiments of a radar system 70, including a crystal-controlled receiver oscillator 72 for generating the carrier frequency $f_o$ of the radar receiver. A transmitter crystal-controlled oscillator 74 generates a frequency $(f_o + f_{IF}/N)$, where $f_{IF}$ is the intermediate-frequency of the radar receiver, and N is an integer. A function generator 54, again generally a linear FM sweep generator, triggered by pulses from the trigger pulse generator 32, modulates the output of the transmitter crystal-controlled oscillator 74 as a function $\pm\Delta f/N$ of frequency $f$. A phase modulator 76, has as the two inputs the outputs from the transmitter crystal-controlled oscillator 74 and the function generator 54, and has an output frequency $[(f_o + f_{IF})/N] \pm (\Delta f/N)$. An N-times multiplier 78 multiplies the output of the phase modulator 76, to result in an output having a frequency $f_o + f_{IF} \pm \Delta f$.

Finally, a gating circuit 80, gated by pulse generator 32, gates out the signal component $f_o + f_{IF}$ during the time when the radar is not transmitting a pulse from the trigger. The output of the gating circuit is a signal having a frequency $f_o + f_{IF} \pm \Delta f$ during the time when the radar is transmitting. This output represents a signal at a frequency $f_o + f_{IF}$ which is frequency-modulated from $-\Delta f$ to $+\Delta f$. The gate 80 is needed for the output signal of the N-times multiplier 78, having the frequency $f_o + f_{IF} \pm \Delta f$ to develop a transmitted pulse having the desired frequency. Gating in a specific embodiment was accomplished by means of a gridded power amplifier device.

Gate 80 and function generator 54 are "turned on" (gate opened) only when the radar transmitter is transmitting. At all other times they are "turned off" (gate closed). When gate 80 is turned on by trigger pulse generator 32, function generator 54 is also turned on to produce a singal $\Delta f/N$ which frequency-modulates signal $[(f_o + f_{IF})/N]$ in phase modulator 76. The output signal from phase modulator 76 is then $[(f_o + f_{IF})/N] \pm \Delta f/N$, as shown. After processing through the N-times multiplier 78, this signal becomes $f_o + f_{IF} \pm \Delta f$ (i.e., a signal operating at frequency $f_o + f_{IF}$ and frequency-modulated from $-\Delta f$ to $+\Delta f$).

When the function generator 54 and gate 80 are turned off, the N-times multiplier 78 output signal is $f_o + f_{IF}$. However, the gate 80 turn-off prevents this signal from getting through the gate when that gate 80 is turned off.

FIGS. 3A and 3B do not need a similar gate because gate 80 (FIG. 3C) is used to prevent the $f_o + f_{IF}$ signal from leaking into the radar's microwave, antenna, and receiver system when the transmitter is turned off. In FIGS. 3A and 3B, the $f_o + f_{IF}$ signal only lasts while the radar transmitter is turned on. When the radar transmitter is turned off, the $f_{IF}$ signal (waveforms 36A and 60A in FIGS. 3A and 3B, respectively) are off, and only the $f_o$ signal is on. The mixer (40 and 62 in FIGS. 3A and 3B, respectively) suppresses that $f_o$ signal.

There are two separate frequencies which must be maintained within prescribed limits. One is the assigned transmitter setting, which must be stabilized to avoid interference with assignments to other radars. The other is the intermediate frequency, generally 30 MHz, where stabilization is necessary to preserve range accuracy. The stability of each of these is dependent both on the oscillator itself and the manner in which it is used. The transmitter frequency has a ±500 KHz tolerance. The least stable of the oscillators investigated is stable, on a long-term basis, to 1 part in $10^4$, or ±250 kHz. Thus, the likelihood is that the frequency will require only occasional readjustment for the two-cavity klystron oscillator and not at all for the others. There are three possible stability levels for the intermediate frequency, corresponding to the three embodiments shown in FIG. 3.

Where mixing is employed with a voltage-controlled intermediate frequency generator, as shown in FIG. 3A, the best long term 30-MHz stability obtainable is about one part in $10^4$, that is, to within 3 kHz, which meets system requirements. However, this may need occasional, perhaps semimonthly, adjustment. Where mixing is used with a crystal-controlled intermediate frequency generator, as shown in FIG. 3B, the poorest stability, for example, with no oven control or no crystal pre-aging, will be about 3 parts in $10^5$, which corresponds to about 1 kHz, and much greater stability is achievable. No readjustment should be necessary.

If two separate channels are used for the transmitter and the receiver, as shown in the embodiment of FIG. 3C, the worst case becomes the sum of the separate stabilities. Thus, if the crystal oscillators are each held to one part in $10^6$, about the best practically realizable, the worst case for the long-term stability of the 30 MHz difference will be two parts in $10^6$, applied to the radio frequency, or about 10 kHz, which still meets system requirements of ±5 kHz. To maintain the required stability, a weekly readjustment of one of the oscillators will suffice.

The reduction in the number of tunable devices and the improvements in the oscillator stability in all the systems considered represent major improvements in the transmitter. In the power amplifier stage, all choices show sufficient bandwidth to insure passing even wide fluctuations in frequency. However, the usual klystron power amplifier does not cover the required 300 MHz and, for large changes in frequency assignment, it must be tuned. This operation requires approximately thirty minutes. The other power amplifiers required no tuning whatever.

The driver is, in all instances, very broad-band and requires no tuning. In the oscillator stage, the choices indicate wide differences in the tuning effort required to change frequency.

In the mixing configuration, the microwave crystal oscillator needs only replacement of either the base crystal or, at most, replacement of the crystal-controlled low-frequency oscillator. This is the simplest case; it requires the shortest time and also involves no monitoring equipment. The two-cavity klystron has only a single knob control and calibrated frequency dial, but it is unlikely that the frequency can be set safely within ±500 kHz without an external frequency meter or other reference device. The klystron-stalo requires longer time to change frequency because of the need to track both cavity and tube as it is tuned, adjust the phase of the tube output and, in the case of the klystron-stalo, also optimize the reflector voltage setting.

In the new two-oscillator system which employs crystals, frequency change is accomplished by substituting matched crystal pairs which assure the desired 30-MHz separation. However, variations inherent in cutting crystals are such that the frequency, at the C-band, cannot be set initially more closely than 50 kHz, and adjustment must be built into the oscillator to permit setting and maintaining the frequency difference within ±5 kHz. This can be accomplished with a simple test circuit mounted in the antenna, as shown in FIG. 4.

Figure 4:
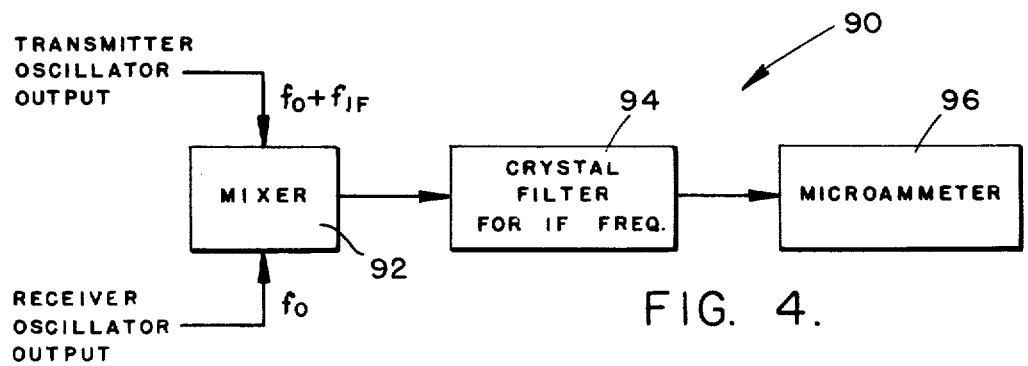
FIG. 4 shows a test circuit for monitoring the intermediate frequency which results from the mixing of the two crystal-controlled frequencies.

To check the frequency difference between the two oscillators, the outputs of the oscillators are manually disconnected from their normal operating positions and connected to the mixer 92 of FIG. 4. Both are set to continuous-wave operation for this test. Either or both oscillators are then tuned until the output of the crystal filter 94 is peaked for maximum reading on the microammeter 96, to establish the proper frequency. The filter 94 has approximately a 500 Hz bandwidth, so that the method has good accuracy.

Obviously many modifications and variations of the present invention are possible in the light of the above teachings. It is therefore to be understood that, within the scope of the appended claims, the invention may be practiced otherwise than as specifically described.

What is claimed is:

1. A radar system including a transmitter and receiver, comprising:
   a local crystal-controlled oscillator for producing a carrier frequency $f_o$, which is the local oscillator frequency for the transmitter and receiver;
   a trigger pulse generator;
   a crystal-controlled IF generator, one of whose inputs is connected to the trigger pulse generator, for generating a train of frequencies having a frequency $f_{IF}$, the train being triggered by and limited in length and time duration $\Delta t$ by pulses generated by the trigger pulse generator;
   a function generator triggered coincidentally with the IF generator by pulses, of the same time duration $\Delta t$, from the trigger pulse generator, whose output is connected to the input of the IF generator, for modulating the train of pulses generated by the crystal-controlled IF generator as a function $\Delta f$ of frequency $f$;
   a mixer whose inputs are the outputs of the local oscillator and the crystal-controlled IF generator, and whose output frequency is $f_o \pm f_{IF} \pm \Delta f$; and
   an upper sideband filter connected to the output of the mixer, for removing all sidebands except those within the frequency range of $f_o + f_{IF} \pm \Delta f$, this being the transmitter output frequency.

2. A radar system as defined in claim 1 wherein the function generator is a linear FM sweep generator, sweeping the train of frequencies at a linear rate, thereby frequency-modulating the train.

3. A radar system, including a transmitter and receiver, comprising:
   a first crystal-controlled oscillator, for generating a carrier frequency oscillating at a frequency of $f_o/N$, where $f_o$ is the local oscillator frequency of the receiver and $N$ is an integer;
   a trigger pulse generator;
   a function generator, connected to, and triggered by pulses from, the trigger pulse generator, the pulses having a time duration $\Delta t$, for modulating the carrier frequency $f_o/N$ as a function $\Delta f$ of frequency $f$;
   a phase modulator, having as inputs the carrier output of the first crystal-controlled oscillator and the modulating output of the function generator, for modulating the carrier frequency $f_o/N$, resulting in an output frequency $f_o/N \pm \Delta F/N$;

an N-times multiplier, connected to, and for multiplying, the output of the phase modulator to produce an output frequency $f_o \pm \Delta f$;

a second crystal-controlled oscillator, connected to the trigger pulse generator, for generating a train of frequencies having a frequency $f_{IF}$, the IF frequency of the receiver of the radar system, the train being triggered by and limited in length and time duration $\Delta t$ by pulses from the trigger pulse generator, the start of the pulse being coincident with the start of the function generator pulses;

a mixer, connected to, and for mixing, the outputs of the N-times multiplier and the second crystal-controlled oscillator, to produce an output having a frequency $f_o \pm f_{IF} \pm \Delta f$; and a filter connected to the output of the mixer for removing all sidebands except those within the frequency range of $f_o + f_{IF} \pm \Delta f$.

4. A radar system as defined in claim 3, wherein the function generator is a linear FM sweep generator, sweeping the train of frequencies at a linear rate, and frequency-modulating the frequency $f_o/N$ by an amount $\pm \Delta f/N$.

5. A radar system, including a transmitter and receiver, comprising:

a transmitter crystal-controlled oscillator generating a frequency $(f_o + f_{IF})/N$, where $f_o$ is the local oscillator frequency of the receiver, $f_{IF}$ is the intermediate-frequency of the radar receiver, and $N$ is an integer;

a trigger pulse generator;

a function generator, connected to, and triggered by pulses from, the trigger pulse generator, the pulses having a time duration $\Delta t$, for modulating the output of the transmitter crystal-controlled oscillator as a function $\Delta f$ of frequency $f$;

a phase modulator, having as its two inputs the outputs from the transmitter crystal-controlled oscillator and the function generator, and having an output frequency $[(f_o + f_{IF})/N] \pm (\Delta f/N)$;

an N-times multiplier, connected to, and for multiplying, the output of the phase modulator, to result in an output having a frequency $f_o + f_{IF} \pm \Delta f$ during the time that the radar is transmitting; and a gating circuit, connected to the output of the N times multiplier, and gated by pulses from the trigger pulse generator, for gating out the signal component $f_o + f_{IF}$ during the time when the radar is not transmitting; whereby the output of the gating circuit is a signal having a frequency $f_o + f_{IF} \pm \Delta f$ when the radar is transmitting.

6. A radar system according to claim 5, wherein the function generator is a linear FM sweep generator, frequency-modulating the frequency $(f_o + f_{IF})/N$ by an amount $\pm \Delta f/N$.

* * * * *